United States Patent [19]

Hovens

[11] 4,015,287
[45] Mar. 29, 1977

[54] COLOR TELEVISION RECEIVER INCLUDING A CHROMINANCE SUBCARRIER REGENERATOR

[75] Inventor: Paulus Joseph Maria Hovens, Eindhoven, Netherlands

[73] Assignee: U.S. Philips Corporation, New York, N.Y.

[22] Filed: Feb. 2, 1976

[21] Appl. No.: 654,556

[30] Foreign Application Priority Data

Feb. 25, 1975 Netherlands ............... 7502200

[52] U.S. Cl. .......................... 358/17; 358/19; 331/20; 331/28
[51] Int. Cl.² ........................... H04N 9/44
[58] Field of Search ................... 331/20, 28; 178/69.5 CB; 358/17, 19

[56] References Cited

UNITED STATES PATENTS

| | | | |
|---|---|---|---|
| 2,841,642 | 7/1958 | Richman | 358/17 |
| 2,956,112 | 10/1960 | O'Toole | 358/19 |
| 3,624,296 | 11/1971 | Slavik et al. | 178/69.5 CB |
| 3,781,701 | 12/1973 | Cecchin et al. | 178/69.5 CB |

*Primary Examiner*—John C. Martin
*Assistant Examiner*—Aristotelis M. Psitos
*Attorney, Agent, or Firm*—Frank R. Trifari; Henry I. Steckler

[57] ABSTRACT

Switching the time constant of a filter in the APC-loop of a color television receiver is done by a keyed transistor switch so that the circuit is suitable to be formed as an integrated circuit.

1 Claim, 1 Drawing Figure

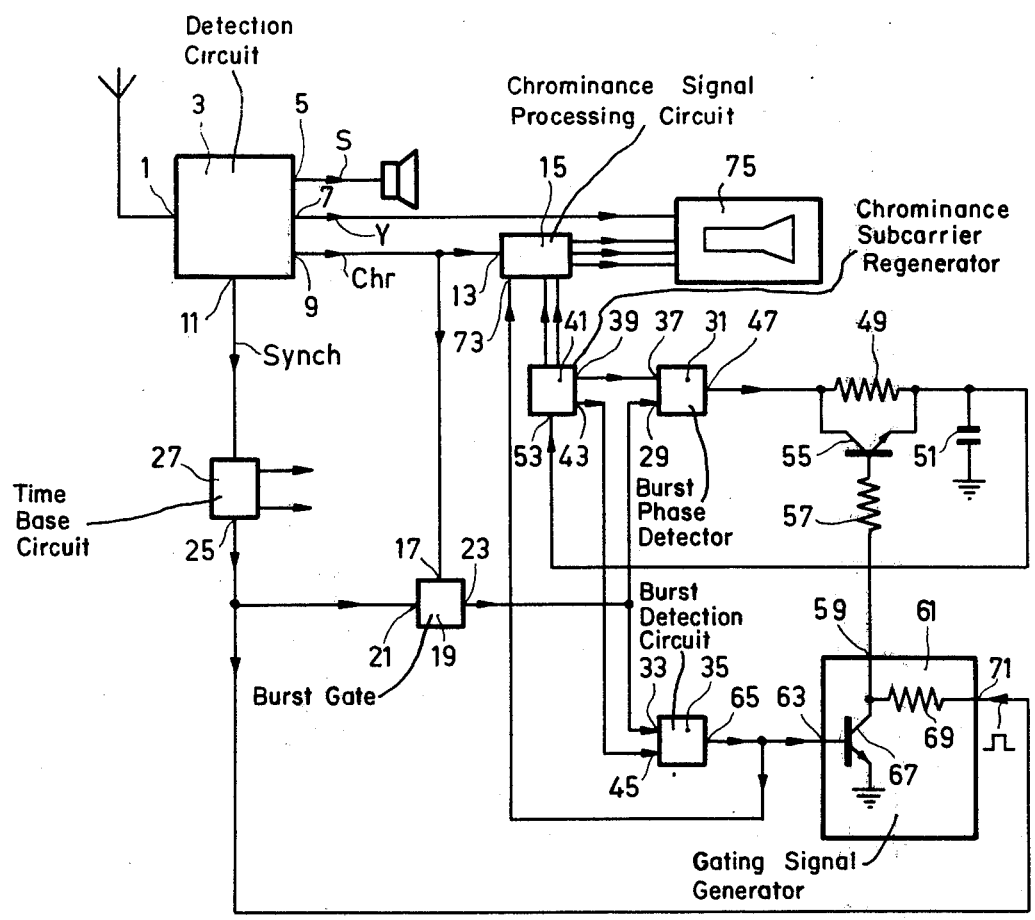

COLOR TELEVISION RECEIVER INCLUDING A CHROMINANCE SUBCARRIER REGENERATOR

The invention relates to a colour television receiver including a chrominance subcarrier regenerator having a phase control circuit comprising a filter including a resistor and a capacitor and incorporated between an output of a colour burst phase detector and a control signal input of the regenerator, the time constant of said filter being switchable by means of an output signal from a burst detection circuit.

A colour television receiver of the kind described above is known from United Kingdom Pat. Specification No. 781,893. The capacitor is connected to earth through a further resistor and an AC-coupled cathode follower is provided between the connection of the capacitor and the further resistor and the output of the burst phase detector, which cathode follower reduces the time constant of the filter in a non-synchronised stage of the regenerator so as to cause the phase control circuit to pull in at fairly large frequency deviations. In a synchronised state of the regenerator the cathode follower is blocked and the time constant of the filter is long so that a phase control which is insensitive to interference is obtained.

The object of the invention is to render the circuit more suitable to be formed as an integrated circuit.

To this end a colour television receiver of the kind described in the preamble according to the invention is characterized in that a transistor is arranged in parallel with at least part of the resistor, and the base of said transistor is coupled to an output of a gating signal generator an imput of which is coupled to an output of the burst detection circuit and a further input of which is coupled to an output of a pulse generator so that in a non-synchronised state of the regenerator a gating signal occurs at the base of the transistor resulting in the said part of the resistor being shunted by the transistor substantially only during the occurrence of the burst.

Since the transistor arranged across the resistor of the filter can only conduct during the occurrence of the burst, a direct voltage coupling of the transistor and the filter can be used without the transistor having a noticeable influence on the phase control voltage. An extra capacitor such as the one necessary in te prior commonly used alternating voltage coupling is rendered superfluous by the direct voltage coupling. Therefore it is not necessary to provide connection terminals for such a capacitor in an integrated circuit.

The invention will now be described with reference to the drawing comprising a sole FIGURE.

The FIGURE illustrates a colour television receiver according to the invention, largely in a block schematic diagram.

When a colour television signal is applied to an input 1 of a HF, IF and detection section 3, a sound signal S appears at an output 5, a luminance signal Y appears at an output 7 and a chrominance signal CHR appears at an output 9 and a synchrnonising signal Synch. appears at an output 11.

The chrominance signal is passed from the output 9 to an input 13 of a chrominance signal processing circuit 15 and to an imput 17 of a burst gate 19.

Under the influence of a line frequency pulse signal which is applied to a further imput 21 of the burst gate 19, the burst only appears at an output 23 thereof. To this end the further input 21 is connected to an output 25 of a time base circuit 27 synchronised by the synchronising signal originating from output 11 of the section 3.

The burst is passed from the output 23 of the burst gate 19 to an input 29 of a burst phase detector 31 and to an input 33 of a burst detection circuit 35. A further input 37 of the phase detector 31 is connected to an output 39 of a chrominance subcarrier regenerator 41 a further output 43 of which is connected to a further input 45 of the detection circuit 35.

A resistor 49 constituting a filter with a capacitor 51 is connected to an output 47 of the phase detector 31 so that a voltage which is a measure of the phase deviation between the signals at the inputs 29 and 37 of the phase detector 31 is set up across the capacitor 51. The voltage across the capacitor 51 is applied to a control signal input 53 of the regenerator 41 so that this phase deviation can be corrected.

The emitter collector path of an npn-transistor 55 is arranged in parallel with the resistor 49 of the filter. The base of the transistor 55 receives a gating signal through a resistor 57 from an output 59 of a gating signal generator 61.

This gating singal occurs when a voltage cutting off an npn-transistor 67 in the gating circuit 61 occurs at an input 63 which is connected to an output 65 of the burst detector 35. The emitter of transistor 67 is connected to ground and the base is connected to the input 63. The collector is connected through a resistor 69 to a further input 71 of the gating signal generation 61. This further input 71 receives line frequency pulses from the output 25 of the time base circuit 27 which pulses render this further input 71 positive during the occurrence of the burst. Since the transistor 67 is cut off, the output 59 is also rendered positive. As a result the transistor 55 short-circuits the resistor 49 so that capacitor 51 can be quickly recharged to the voltage producing the detected burst at the output 47 of the phase detector 31.

The voltage at the output 65 of the detection circuit 35 cuts off the transistor 67 when the regenerator 41 is not synchronised with the burst. Due to the above-described action of the transistor 55 and the gating signal generator 61 an accelerated synchronisation is effected. When the synchronised state is reached, the output 65 of the detection circuit 35 applies a voltage to the input 63 of the gating signal generator 61 which voltage causes the transistor 67 to conduct so that the transistor 55 is cut off and the resistor 49 is again in series with the capacitor 51. The time constant of a filter 49, 51 is then long and possible noise signals at the output 47 of the phase detector 31 substantially have no influence on the phase control of the regenerator 41.

Due to the short duration of the periods of conductance of the transistor 55 in the non-synchronised stage of the regenerator 41, the base current of the transistor 57 has substantially no influence on the charge condition of the capacitor 51 so that no unwanted influence on the phase control can occur.

Furthermore the ouptut 65 of the detection circuit 35 pplies a colour killer signal to an input 73 of the chrominance signal processing circuit 15.

As is known the chrominance signal processing circuit receives rference signals from the regenerator 41 and aplies colour difference signals to a television display section 75.

The burst detection circuit 35 in this embodiment is a synchronous detection circuit as is often used in NTSC-receivers. In, for examle, PAL-receivers it is alternatively possible to obtain an identification signal of half the line frequency from the phase detector 31 and to detect and process this signal to a signal to be applied to the input 63 of the gating signal generator 61. It will be evident that any detection circuit giving an indication about the synchronising stage of regenerator 41 is suitable.

Furthermore it will be evident that, if necessary, only part of the resistor 49 may be shunted by the transistor 55.

Arranged in parallel with the transistor 55 may be a further npn-transistor whose collector is connected to the emitter of the transistor and whose emitter is connected to the collector of the transistor 55 and whose base is likewise connected through a resistor to the output 59 of the gating signal generator 61.

The transistors 55 and 67 may have a different conductivity type if the rest of the circuit is adapted accordingly.

What is claimed is:

1. A colour television receiver including a chrominance subcarrier regenerator having a phase control circuit comprising a filter having a resistor and a capacitor incorporated between an output of a burst phase detector and a control signal input of the regenerator, the time constant of said filter being switchable by means of an output signal from a burst detection circuit, characterized in that a transistor is arranged in parallel with at least part of the resistor, the base of said transistor being coupled to an output of a gating signal generator, an input of said gating singal generator being coupled to an output of the burst detection circuit and a further input being coupled to an output of a pulse generator so that in a non-synchronised state of the regenerator a gating singal occurs at the base of the transistor resulting in the said part of the resistor being substantially shunted by the transistor during the occurrence of the burst.

* * * * *